United States Patent
Pheasey

(10) Patent No.: US 8,376,616 B2
(45) Date of Patent: Feb. 19, 2013

(54) BEARING ASSEMBLY FOR A DOWNHOLE MOTOR

(75) Inventor: Frederick William Pheasey, Edmonton (CA)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 13/256,133

(22) PCT Filed: Mar. 10, 2010

(86) PCT No.: PCT/US2010/026771
§ 371 (c)(1),
(2), (4) Date: Nov. 7, 2011

(87) PCT Pub. No.: WO2010/104915
PCT Pub. Date: Sep. 16, 2010

(65) Prior Publication Data
US 2012/0114274 A1    May 10, 2012

Related U.S. Application Data

(60) Provisional application No. 61/159,696, filed on Mar. 12, 2009.

(51) Int. Cl.
*F16C 21/00*    (2006.01)
*F16C 19/30*    (2006.01)
*F16C 17/04*    (2006.01)

(52) U.S. Cl. ............ 384/91; 384/97; 384/126; 384/590; 384/618; 175/107; 175/325.3

(58) Field of Classification Search ............... 384/97, 384/291, 304, 420, 590, 606–607, 618, 91, 384/126; 175/107, 228, 237, 320, 325.3
See application file for complete search history.

(56) References Cited

U.S. PATENT DOCUMENTS

| 1,643,338 | A |   | 9/1927  | Halvorsen |
|-----------|---|---|---------|-----------|
| 3,268,233 | A | * | 8/1966  | Brown ........................... 277/343 |
| 4,114,704 | A | * | 9/1978  | Maurer et al. ................. 175/228 |
| 4,382,639 | A |   | 5/1983  | McGuffie |
| 5,150,972 | A |   | 9/1992  | Wenzel |
| 5,195,754 | A | * | 3/1993  | Dietle ........................... 175/107 |
| 5,248,204 | A | * | 9/1993  | Livingston et al. ............. 384/97 |
| 5,364,192 | A | * | 11/1994 | Damm et al. ................. 384/420 |
| 5,368,398 | A | * | 11/1994 | Damm et al. ................. 384/304 |

(Continued)

FOREIGN PATENT DOCUMENTS

CA    2026630        10/1990
WO    2010104915 A1  9/2010

OTHER PUBLICATIONS

International Application No. PCT/US2010/026771 Search Report and Written Opinion dated Mar. 10, 2010.

*Primary Examiner* — Marcus Charles
(74) *Attorney, Agent, or Firm* — Conley Rose, P.C.

(57) ABSTRACT

In a downhole motor bearing section having a cylindrical mandrel rotatably disposed within a cylindrical housing, a bi-directional thrust bearing is disposed within a four-shouldered annular containment chamber formed partially into the inner cylindrical wall of the housing and partially into the outer cylindrical wall of the mandrel. Under on-bottom loading conditions, thrust loads are transferred through the thrust bearing by the upper shoulder of the housing and the lower shoulder of the mandrel. The radial widths of these two shoulders are both symmetrical about the centerline of the thrust bearing such that on-bottom thrust loads are transferred non-eccentrically to the thrust bearing, thereby avoiding twisting loads on the thrust bearing races, increasing the effective on-bottom load capacity of the thrust bearing and extending its service life.

25 Claims, 2 Drawing Sheets

U.S. PATENT DOCUMENTS

| | | |
|---|---|---|
| 5,664,891 A | 9/1997 | Kutinsky et al. |
| 6,059,050 A * | 5/2000 | Gray .................... 175/73 |
| 6,109,790 A * | 8/2000 | von Gynz-Rekowski et al. .................... 384/291 |
| 6,250,806 B1 * | 6/2001 | Beshoory .................... 384/97 |
| 6,416,225 B1 | 7/2002 | Cioceanu et al. |
| 8,181,720 B2 * | 5/2012 | Prill et al. .................... 384/606 |
| 2003/0015352 A1 | 1/2003 | Robin |
| 2008/0029304 A1 | 2/2008 | LeBlanc et al. |

* cited by examiner

BEARING ASSEMBLY FOR A DOWNHOLE MOTOR

CROSS-REFERENCE TO RELATED APPLICATION

This application is the U.S. National Stage under 35 U.S.C. §371 of International Patent Application No. PCT/US2010/026771 filed Mar. 10, 2010, which claims the benefit of U.S. Provisional Application No. 61/159,696 filed Mar. 12, 2009, entitled "Bearing Assembly For A Downhole Motor."

STATEMENT REGARDING FEDERALLY SPONSORED RESEARCH OR DEVELOPMENT

Not applicable.

BACKGROUND

The invention relates generally to bearing assemblies, and in particular to bearing assemblies for downhole motors for use in drilling of oil, gas, and water wells.

In drilling a borehole (or wellbore) into the earth, such as for the recovery of hydrocarbons or minerals from a subsurface formation, it is conventional practice to connect a drill bit onto the lower end of an assembly of drill pipe sections connected end-to-end (commonly referred to as a "drill string"), and then rotate the drill string so that the drill bit progresses downward into the earth to create the desired borehole. In conventional vertical borehole drilling operations, the drill string and bit are rotated by means of either a "rotary table" or a "top drive" associated with a drilling rig erected at the ground surface over the borehole (or, in offshore drilling operations, on a seabed-supported drilling platform or a suitably adapted floating vessel).

During the drilling process, a drilling fluid (also commonly referred to in the industry as "drilling mud", or simply "mud") is pumped under pressure downward from the surface through the drill string, out the drill bit into the borehole, and then upward back to the surface through the annular space between the drill string and the wellbore. The drilling fluid, which may be water-based or oil-based, is typically viscous to enhance its ability to carry borehole cuttings to the surface. The drilling fluid can perform various other valuable functions, including enhancement of drill bit performance (e.g., by ejection of fluid under pressure through ports in the drill bit, creating mud jets that blast into and weaken the underlying formation in advance of the drill bit), drill bit cooling, and formation of a protective cake on the borehole wall (to stabilize and seal the borehole wall).

Particularly since the mid-1980s, it has become increasingly common and desirable in the oil and gas industry to drill horizontal and other non-vertical boreholes (i.e., "directional drilling"), to facilitate more efficient access to and production from larger regions of subsurface hydrocarbon-bearing formations than would be possible using only vertical boreholes. In directional drilling, specialized drill string components and "bottomhole assemblies" (BHAs) are used to induce, monitor, and control deviations in the path of the drill bit, so as to produce a borehole of desired non-vertical configuration.

Directional drilling is typically carried out using a "downhole motor" (alternatively referred to as a "drilling motor" or "mud motor") incorporated into the drill string immediately above the drill bit. A typical downhole motor includes several primary components, as follows (in order, starting from the top of the motor assembly):

- a top sub adapted to facilitate connection to the lower end of a drill string ("sub" being the common general term in the oil and gas industry for any small or secondary drill string component);
- a power section comprising a positive displacement motor, with a helically-vaned rotor eccentrically rotatable within a stator section;
- a drive shaft enclosed within a drive shaft housing, with the upper end of the drive shaft being operably connected to the rotor of the power section; and
- a bearing section comprising a cylindrical mandrel coaxially and rotatably disposed within a cylindrical housing, with an upper end coupled to the lower end of the drive shaft, and a lower end adapted for connection to a drill bit.

In drilling processes using a downhole motor, drilling fluid is circulated under pressure through the drill string and back up to the surface as in conventional drilling methods. However, the pressurized drilling fluid exiting the lower end of the drill pipe is diverted through the power section of the downhole motor to generate power to rotate the drill bit.

The bearing section must permit relative rotation between the mandrel and the housing, while also transferring axial thrust loads between the mandrel and the housing. Axial thrust loads arise in two drilling operational modes: "on-bottom" loading, and "off-bottom" loading. On-bottom loading corresponds to the operational mode during which the drill bit is boring into a subsurface formation under vertical load from the weight of the drill string, which in turn is in compression; in other words, the drill bit is on the bottom of the borehole. Off-bottom loading corresponds to operational modes during which the drill bit is raised off the bottom of the borehole and the drill string is in tension. This condition occurs, for instance, when the drill string is being pulled out of the borehole, putting the drill string into tension due to the weight of drill string components. Tension loads across the bearing section housing and mandrel are also induced when circulating drilling fluid with the drill bit off bottom, due to the pressure drop across the drill bit and bearing assembly.

Accordingly, the bearing section of a downhole motor must be capable of withstanding thrust loads in both axial directions, with the mandrel rotating inside the housing. This has been accomplished in some prior art bearing assemblies by using a first thrust bearing assembly configured to resist on-bottom thrust loads only, and a second thrust bearing assembly configured to resist off-bottom thrust loads only. Suitable radial bearings are used to maintain coaxial alignment between the mandrel and the bearing housing.

Each thrust bearing assembly typically comprises bearings (usually but not necessarily roller bearings) contained within a bearing cage disposed within an annular bearing containment chamber, the outer portion of which extends radially outward into the housing, and the inner portion of which extends radially inward into the mandrel. Other prior art bearing sections for downhole motors use one or more bi-directional thrust bearings rather than separate thrust bearings for on-bottom and off-bottom loads. Using this arrangement, the bearing section can be significantly shorter than a bearing section incorporating separate on-bottom and off-bottom thrust bearing assemblies.

U.S. Pat. No. 5,150,972 (Wenzel) provides an example of a downhole motor bearing assembly that uses a bi-directional thrust bearing disposed within a bearing containment chamber generally as described above. The inner and outer portions of the containment chamber each define an upper shoulder and a lower shoulder. These four shoulders lie in parallel planes which are perpendicularly transverse to the coincident longitudinal axes of the housing and mandrel. The inner upper shoulder is closely adjacent to the outer upper shoulder, and the inner lower shoulder is closely adjacent to the outer lower shoulder. The relative axial positions of the inner and outer shoulders will change slightly due to relative axial movement between the housing and the mandrel as the assembly shifts between on-bottom and off-bottom loading conditions. The thrust bearing, with associated upper and lower bearing races, is disposed between these four shoulders. When the bearing section is subjected to on-bottom loading, the axial thrust loads react against the thrust bearing through the outer upper shoulder and the inner lower shoulder of the containment chamber. Under off-bottom loading, the axial thrust loads react against the thrust bearing through inner upper shoulder and the outer lower shoulder.

One problem with the Wenzel bearing assembly is that under both on-bottom and off-bottom loading conditions, the thrust bearing is always being loaded eccentrically, due to the radial offset between the resultant load paths acting through the operative shoulders of the bearing containment chamber. Such eccentric loading tends to twist the bearing races, which can result in damage to the bearing assemblies and reduced bearing service life. Eccentric loading thus reduces the total thrust load that a given thrust bearing can withstand, and necessitates the use of more robust thrust bearing components than would be required if the thrust loads were transferred through the thrust bearing without eccentricity.

In practical terms, this is primarily a concern with respect to on-bottom thrust loads, the highest of which are typically much greater than the highest off-bottom loads for a given drilling operation. Therefore, a bi-directional thrust bearing will typically be designed for the maximum on-bottom thrust load. Since the bi-directional thrust bearing will typically have the same maximum thrust load capacity in both directions, and since the maximum off-bottom thrust loads will be substantially less than the maximum on-bottom thrust loads, the expected off-bottom thrust loads will rarely if ever be a limiting design factor.

For at least the foregoing reason, there is a need for a bearing assembly for a downhole motor in which on-bottom thrust loads are transferred through bi-directional thrust bearings without eccentricity, thus maximizing the on-bottom thrust load capacity of the bearing assembly. The embodiments described herein are directed to this need.

SUMMARY

In general terms, embodiments described herein provide a bearing assembly having a bi-directional thrust bearing disposed within a four-shouldered containment chamber, in which the annular shoulders transferring on-bottom axial thrust loads to the thrust bearing (i.e., the outer upper and inner lower shoulders) are symmetrical about the center of the thrust bearing races. Therefore, the load paths (i.e., resultant force vectors) of the axial thrust loads reacting against the outer upper and inner lower shoulders under on-bottom loading conditions are substantially in alignment, and pass through the center of the bearing race, thus eliminating eccentric axial loading on the thrust bearing.

In one embodiment, a bearing assembly comprises an outer cylindrical member that has a longitudinal axis, a generally cylindrical bore, and a cylindrical inner surface. A first annular recess formed into the cylindrical inner surface defines axially-spaced outer upper and outer lower shoulders. The assembly further includes an inner cylindrical member rotatably disposed within the bore of the outer tubular member. The inner tubular member has an outer cylindrical surface into which is formed a second annular recess defining axially-spaced inner upper and inner lower shoulders. The inner tubular member is longitudinally movable within the outer tubular member between a first position in which the inner upper shoulder and the inner lower shoulder are displaced below the outer upper shoulder and the outer lower shoulder, respectively; and a second position in which the inner upper shoulder and the inner lower shoulder are displaced above the outer upper shoulder and the outer lower shoulder, respectively.

The first and second annular recesses, in juxtaposition, define an annular containment chamber for receiving a thrust bearing assembly of generally annular configuration. The outer upper shoulder is planar and has a first radial width. The inner lower shoulder is planar and has a second radial width. The outer upper shoulder and the inner lower shoulder lie in parallel planes transverse to the longitudinal axis, and the first and second radial widths are symmetrical about a common centerline parallel to the longitudinal axis.

In a another embodiment, a bearing assembly particularly adapted for use in association with a downhole motor comprises a generally cylindrical housing having a longitudinal axis, a generally cylindrical bore, and a cylindrical inner surface. A first annular recess formed into the cylindrical inner surface defines axially-shaped outer upper and an outer lower shoulder shoulders. The bearing assembly further includes a generally cylindrical mandrel rotatably disposed within the bore of the housing. The mandrel has an outer cylindrical surface into which is formed a second annular recess defining axially-spaced inner upper and inner lower shoulders. The mandrel is longitudinally movable within the housing between a first position in which the inner upper shoulder and the inner lower shoulder are displaced below the outer upper shoulder and the outer lower shoulder, respectively; and a second position in which the inner upper shoulder and the inner lower shoulder are displaced above the outer upper shoulder and the outer lower shoulder, respectively.

The first and second annular recesses, in juxtaposition, define an annular containment chamber which houses a thrust bearing assembly of generally annular configuration. The outer upper shoulder is planar and has a first radial width. The inner lower shoulder is planar and has a second radial width. The outer upper shoulder and the inner lower shoulder lie in parallel planes transverse to the longitudinal axis, and the first and second radial widths are symmetrical about a common centerline parallel to the longitudinal axis.

In preferred embodiments, the thrust bearing assembly comprises a plurality of roller bearings retained within a circular bearing cage, with the bearing cage being disposed between an upper bearing race and a lower bearing race. The bearing case and bearing races have a common circular bearing centerline which is coincident with the common circular centerline of the first radial width of the outer upper shoulder and the second radial width of the inner lower shoulder. Accordingly, when axial thrust loads urge the mandrel toward the above-mentioned second position, thereby bringing the upper bearing race into contact with the outer upper shoulder and bringing the lower bearing race in contact with the inner lower shoulder, and displacing the inner upper shoulder and the outer lower shoulder clear of the thrust bearing assembly, the resultant axial force vectors acting on the outer upper shoulder and the inner lower shoulder will pass though the thrust bearing assembly along a path substantially coincident with the bearing centerline.

BRIEF DESCRIPTION OF THE DRAWINGS

Embodiments of the invention will now be described with reference to the accompanying figures, in which numerical references denote like parts, and in which.

DETAILED DESCRIPTION

Figure 1:
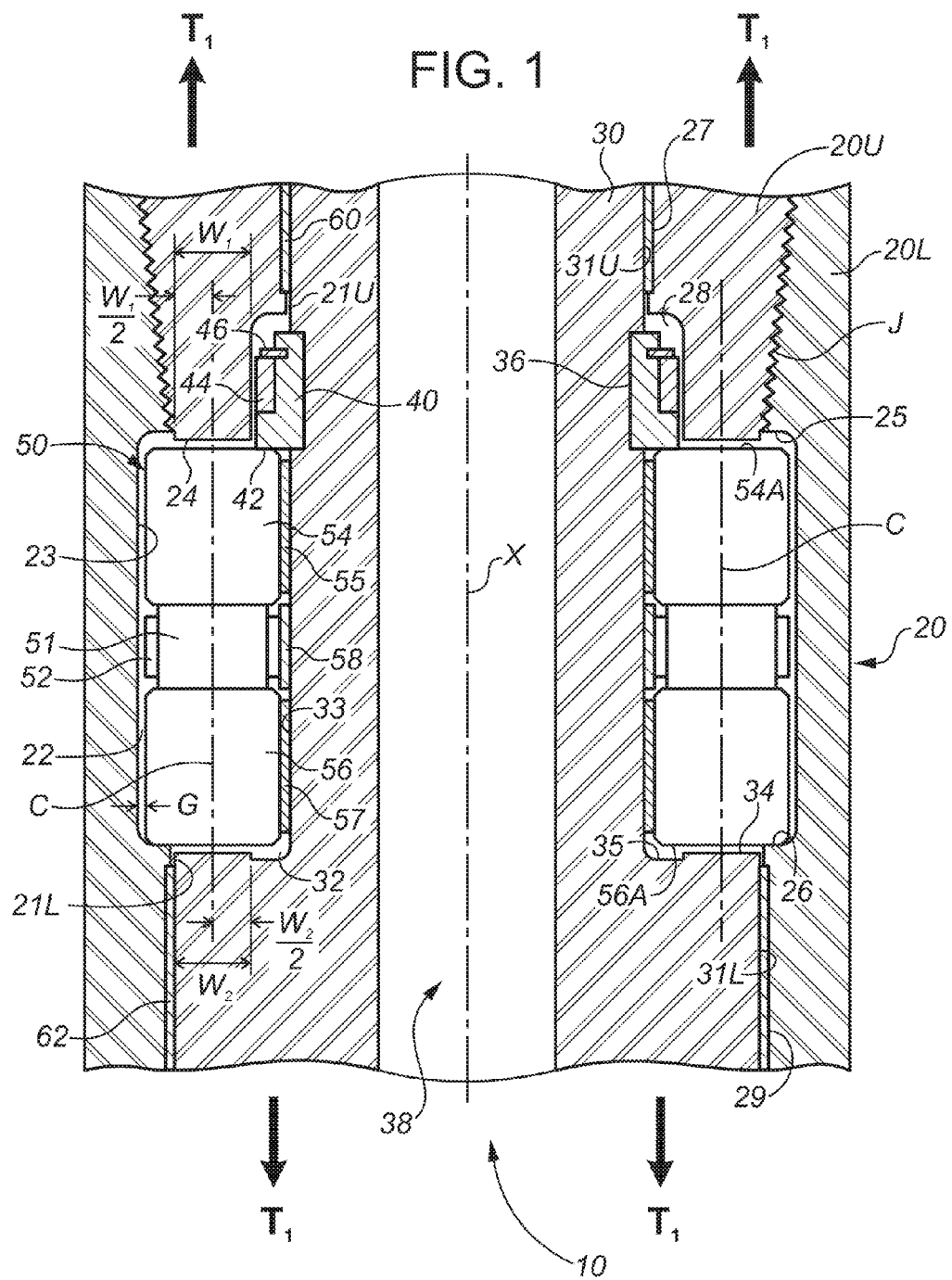
FIG. 1 is a longitudinal cross-sectional view of an embodiment of a downhole motor bearing assembly in accordance with the principles described herein, shown under off-bottom axial thrust loading.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " A reference to an element by the indefinite article "a" does not exclude the possibility that more than one of the element is present, unless the context clearly requires that there be one and only one such element. Any use of any form of the terms "connect", "engage", "couple", "attach", or any other term describing an interaction between elements is not meant to limit the interaction to direct interaction between the subject elements, and may also include indirect interaction between the elements such as through secondary or intermediary structure. Relational terms such as "parallel", "perpendicular", "planar", "coaxial", "coincident", "concentric", "intersecting", "symmetrical", "centered", "equal", and "equidistant" are not intended to denote or require absolute mathematical or geometrical precision. Accordingly, such terms are to be understood as denoting or requiring substantial precision only (e.g., "substantially parallel") unless the context clearly requires otherwise. In addition, as used herein, the terms "axial" and "axially" generally mean along or parallel to a longitudinal or central axis (e.g., central axis of a structure), while the terms "radial" and "radially" generally mean perpendicular to the longitudinal or central axis. For instance, an axial distance refers to a distance measured along or parallel to the central axis, and a radial distance means a distance measured perpendicular to the central axis.

Figure 2:
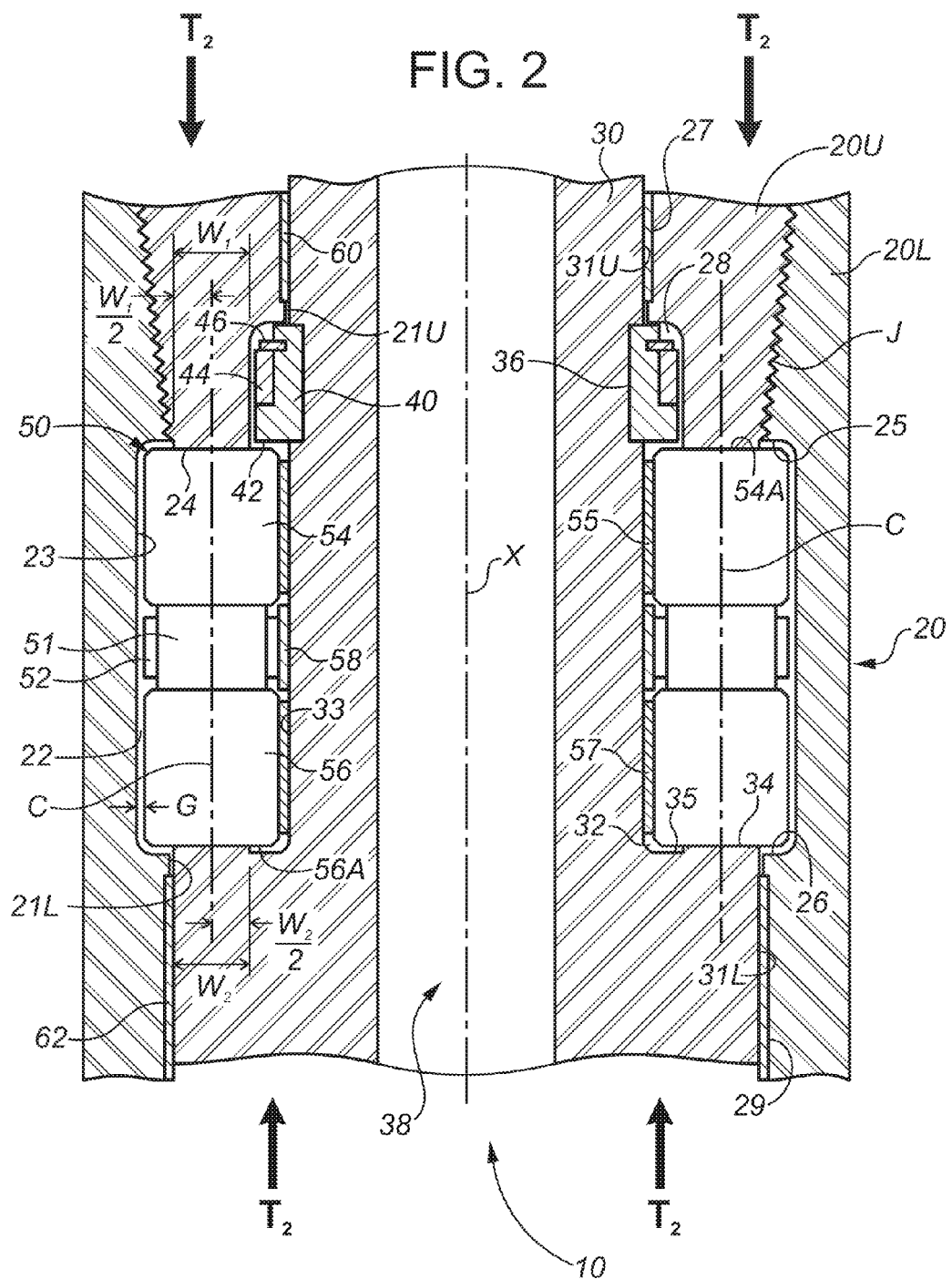
FIG. 2 is a longitudinal cross-sectional view of the downhole motor bearing assembly of FIG. 1, shown under on-bottom axial thrust loading.

FIGS. 1 and 2 illustrate a downhole motor bearing assembly 10 in accordance with one embodiment, shown under off-bottom and on-bottom axial thrust loading conditions respectively. In FIG. 1, force arrows $T_1$ signify off-bottom thrust loads putting the drill string and bearing assembly 10 in tension, while in FIG. 2, force arrows $T_2$ signify on-bottom thrust loads putting the drill string and bearing assembly 10 in compression.

Bearing assembly 10 comprises a cylindrical housing 20 and a cylindrical mandrel 30 rotatably disposed within housing 20, with housing 20 and mandrel 30 having a common longitudinal axis X. An upper portion 20U of housing 20 has an inner upper cylindrical surface 21U, and a lower portion 20L of housing 20 has an inner cylindrical surface 21L, with the diameter of upper cylindrical surface 21U being greater than the diameter of lower cylindrical surface 21L. In the illustrated embodiment, housing 20 is provided with threaded joint J, separating upper and lower portions 20U and 20L, to facilitate assembly of bearing assembly 10. The location and configuration of threaded joint J, as shown in the Figures, is by way of example only.

Formed into lower cylindrical surface 21L of housing 20 is an outer annular recess 22 defining a cylindrical outer recess wall 23 extending between an outer upper annular shoulder 24 and an outer lower annular shoulder 26. Outer upper shoulder 24 and outer lower shoulder 26 of housing 20 are substantially parallel to each other, and lie in planes perpendicularly transverse to longitudinal axis X. Outer recess wall 23 is contiguous with an annular surface 25 outwardly adjacent to outer upper shoulder 24, with outer upper shoulder 24 being proud of (i.e., projecting from) annular surface 25 as shown. Outer upper shoulder 24 has a radial width $W_1$.

As conceptually illustrated in FIGS. 1 and 2, upper and lower radial bushing-type bearings 60 and 62 will typically be provided above and below annular recess 22, in corresponding annular bushing recesses 27 and 29 formed into cylindrical surfaces 21U and 21L, respectively, of housing 20, to maintain coaxial alignment of housing 20 and mandrel 30.

Mandrel 30 has a central bore 38 for circulation of drilling fluid. An upper portion of mandrel 30 has an outer upper cylindrical surface 31U, and a lower portion of mandrel 30 has a outer lower cylindrical surface 31L, with the diameter of upper cylindrical surface 31U being less than the diameter of lower cylindrical surface 31L. Formed into upper cylindrical surface 31U is an inner annular recess 32 defining a cylindrical inner recess wall 33 extending between an inner lower annular shoulder 34 and an inner upper annular shoulder 42. Inner upper shoulder 42 and inner lower shoulder 34 of mandrel 30 are substantially parallel to each other, and lie in planes perpendicularly transverse to longitudinal axis X. Inner recess wall 33 is contiguous with an annular surface 35 inwardly adjacent to inner lower shoulder 34, with inner lower shoulder 34 being proud of annular surface 35 as shown Inner lower shoulder 34 has a radial width $W_2$, which preferably (but not necessarily) will equal to radial width $W_1$ of inner upper shoulder 24.

In the illustrated embodiment, inner upper shoulder 42 is defined by a radially-projecting lower surface of a split ring 40 disposed partially within an annular groove 36 formed into upper cylindrical surface 31U of mandrel 30. Split ring 40 is retained within annular groove 36 by a retainer ring 44, with retainer ring 44 being maintained in position by a snap ring 46 disposed within a corresponding annular groove in split ring 40. An upper annular recess 28 is formed into upper cylindrical surface 21U of upper portion 20U of housing 20 to receive (with appropriate clearances) the sub-assembly comprising split ring 40, retainer ring 44, and snap ring 46.

When housing 20 and mandrel 30 are assembled as shown in the Figures, outer annular recess 22 of housing 20 and inner annular recess 32 of mandrel 30 define an annular bearing chamber for receiving a thrust bearing assembly 50, with outer upper shoulder 24 of housing 20 being closely adjacent to inner upper shoulder 42 of mandrel 30, and with outer lower shoulder 26 of housing 20 being closely adjacent to inner lower shoulder 34 of mandrel 30. The axial distance between outer upper and outer lower shoulders 24 and 26, and the axial distance between inner upper and inner lower shoulders 42 and 34, are both slightly greater than the axial length of thrust bearing assembly 50. This provides thrust bearing assembly 50 with an axial clearance within the bearing containment chamber, sufficient to permit relative axial movement of housing 20 and mandrel 30 between the two positions illustrated in FIGS. 1 and 2.

In the illustrated embodiment, thrust bearing assembly 50 includes a plurality of bearings 51 (typically but not necessarily roller bearings) contained within a bearing cage 52; an upper bearing race 54 disposed above bearings 51; and a lower bearing race 56 disposed below bearings 51. Upper bearing race 54 has an upper face 54A, and lower bearing race 56 has a lower face 56A. In alternative embodiments, spacers (not shown) may be provided in association with bearing races 54 and 56. Typically, an upper bearing race bushing 55, a lower bearing race bushing 55, and a bearing cage bushing 58 will be provided between inner recess wall 33 of mandrel 30 and upper bearing race 54, lower bearing race 56, and bearing cage 52, respectively, to keep all components of thrust bearing assembly 50 concentric about longitudinal axis X. As shown, a suitable outer clearance gap G is also provided between bearing races 54 and 56 and cylindrical wall 23 of outer annular recess 22 of housing 20.

In the Figures, bearings 51, bearing cage 52, bearing races 54 and 56, and bearing cage bushing 58 are illustrated as conceptual blocks only. Persons skilled in the art will appreciate that the specific details of these components can take various forms, and that the embodiments described herein are not in any way limited or restricted to use with thrust bearing components of any particular design or configuration.

Thrust bearing assembly 50 will have a circular bearing centerline C representing an optimal load path for thrust bearing assembly 50 such that axial compressive loads acting on upper face 54A of upper bearing race 54 and lower face 56A of lower bearing race 56 will be distributed with optimal uniformity across the radial width of bearings 51. Preferably, as in the illustrated embodiment, radial width $W_1$ of outer upper shoulder 24 and radial width $W_2$ of inner lower shoulder 34 will be both symmetrical about bearing centerline C.

During operation of bearing assembly 10 under off-bottom thrust loading as in FIG. 1, mandrel 30 rotates within housing 20, upper bearing race 54 rotates with mandrel 30 (with an inner portion of upper face 54A of upper bearing race 54 in contact with inner upper shoulder 42), and lower bearing race 56 rotates with housing 20 (with an outer portion of lower face 56A of lower bearing race 56 in contact with outer lower shoulder 26). Because inner upper shoulder 42 and outer lower shoulder 26 are radially offset, off-bottom thrust loading conditions will result in eccentric loading of thrust bearing assembly 50. However, this will rarely if ever be a practical concern due to the fact that thrust bearing assembly 50 will most commonly be designed for much higher on-bottom thrust loads.

Upon transfer from off-bottom to on-bottom thrust loading conditions as in FIG. 2, upper bearing race 54 abruptly changes from rotating with mandrel 30 to rotating with housing 20 (with a central portion of upper face 54A of upper bearing race 54 in contact with outer upper shoulder 24), and lower bearing race 56 abruptly changes from rotating with housing 20 to rotating with mandrel 30 (with a central portion of lower face 56A of lower bearing race 56 in contact with inner lower shoulder 34). Because radial width $W_1$ of outer upper shoulder 24 and radial width $W_2$ of inner upper shoulder 42 are both symmetrical about bearing centerline C, the contact pressures between outer upper shoulder 24 and upper bearing race 54 and between inner lower shoulder 34 and lower bearing race 56 are substantially uniform, such that the corresponding resultant axial force vectors are substantially coincident with bearing centerline C, thereby effectively eliminating eccentric loading on thrust bearing assembly 50.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Although embodiments described herein have been specifically described in the context of a bearing section for a downhole motor, the principles may also be adapted for other practical applications for bi-directional thrust bearings, without departing from the scope of the invention.

What is claimed is:

1. A bearing assembly comprising:
    (a) an outer cylindrical member having a longitudinal axis, a cylindrical bore, and a cylindrical inner surface into which is formed a first annular recess defining an outer upper shoulder and an outer lower shoulder, said outer upper shoulder and outer lower shoulder being axially spaced apart; and
    (b) an inner cylindrical member rotatably disposed within the bore of the outer tubular member, said inner tubular member having an outer cylindrical surface into which is formed a second annular recess defining an inner upper shoulder and an inner lower shoulder, said inner upper shoulder and inner lower shoulder being axially spaced apart, said inner tubular member being longitudinally movable within the outer tubular member between:
        b.1 a first position in which the inner upper shoulder and the inner lower shoulder are displaced below the outer upper shoulder and the outer lower shoulder, respectively; and
        b.2 a second position in which the inner upper shoulder and the inner lower shoulder are displaced above the outer upper shoulder and the outer lower shoulder, respectively;
    wherein:
    (c) the first and second annular recesses, in juxtaposition, define an annular containment chamber for receiving a thrust bearing;
    (d) the outer upper shoulder is planar and has a first radial width;
    (e) the inner lower shoulder is planar and has a second radial width;
    (f) the outer upper shoulder and the inner lower shoulder lie in parallel planes transverse to the longitudinal axis; and
    (g) the first and second radial widths are symmetrical about a common centerline parallel to the longitudinal axis.

2. The bearing assembly of claim 1 wherein a thrust bearing assembly is disposed within the annular containment chamber.

3. The bearing assembly of claim 2 wherein:
    (a) the thrust bearing assembly comprises a plurality of roller bearings retained within a circular bearing cage, said bearing cage being disposed between an upper bearing race and a lower bearing race; and (b) the bearing case and bearing races have a common circular bearing centerline which is coincident with the common circular centerline of the first radial width of the outer upper shoulder and the second radial width of the inner lower shoulder;

such that when axial thrust loads urge the inner tubular member toward said second position, thereby bringing the upper bearing race into contact with the outer upper shoulder and bringing the lower bearing race in contact with the inner lower shoulder, and displacing the inner upper shoulder and the outer lower shoulder clear of the thrust bearing assembly, the resultant axial force vectors acting on the outer upper shoulder and the inner lower shoulder will pass though the thrust bearing assembly along a path substantially coincident with the bearing centerline.

4. A bearing assembly, comprising:
a housing having a longitudinal axis and a radially inner surface including a first annular recess defining an upper shoulder and a lower shoulder, wherein the upper shoulder of the housing and the lower shoulder of the housing are axially spaced apart;
a mandrel rotatably disposed within the housing, wherein the mandrel has a radially outer surface including a second annular recess defining an upper shoulder and a lower shoulder, wherein the upper shoulder of the mandrel and the lower shoulder of the mandrel are axially spaced apart;
wherein the first annular recess and the second annular recess define an annular containment chamber;
an annular thrust bearing disposed in the annular containment chamber, wherein the thrust bearing has an annular centerline oriented parallel to the longitudinal axis;
wherein the upper shoulder of the housing and the lower shoulder of the mandrel are planar, each being disposed in a plane oriented perpendicular to the longitudinal axis;
wherein the upper shoulder of the housing is radially centered relative to the centerline of the thrust bearing;
wherein the lower shoulder of the mandrel is radially centered relative to the centerline of the thrust bearing;
wherein the mandrel is configured to move axially relative to the housing between:
a first position in which the upper shoulder of the mandrel and the lower shoulder of the mandrel are positioned axially below the upper shoulder of the housing and the lower shoulder of the housing, respectively; and
a second position in which the upper shoulder of the mandrel and the lower shoulder of the mandrel are axially above the upper shoulder of the housing and the lower shoulder of the housing, respectively.

5. The bearing assembly of claim 4, wherein the upper shoulder of the housing has a first radial width;
wherein the lower shoulder of the mandrel has a second radial width;
wherein the first radial width is the same as the second radial width.

6. The bearing assembly of claim 4, wherein the thrust bearing includes an upper bearing race, a lower bearing race, and a bearing axially disposed between the upper bearing race and the lower bearing race.

7. The bearing assembly of claim 6, wherein the upper shoulder of the housing is radially centered relative to the upper bearing race and the lower shoulder of the mandrel is radially centered relative to the lower bearing race.

8. The bearing assembly of claim 4, wherein the thrust bearing includes an upper bearing race and a lower bearing race axially spaced apart from the upper bearing race;
wherein the upper bearing race is configured to engage the upper shoulder of the housing and the upper shoulder of the mandrel;
wherein the lower bearing race is configured to engage the lower shoulder of the housing and the lower shoulder of the mandrel.

9. The bearing assembly of claim 8, wherein the upper shoulder of the housing has a first radial width centered on the annular centerline;
wherein the lower shoulder of the mandrel has a second radial width centered on the annular centerline;
wherein the upper shoulder of the mandrel is positioned radially inward of the annular centerline; and
wherein the lower shoulder of the housing is positioned radially outward of the annular centerline.

10. The bearing assembly of claim 9, further comprising:
an upper annular radial bushing positioned radially between the upper bearing race and the mandrel;
a lower annular radial bushing positioned radially between the lower bearing race and the mandrel.

11. The bearing assembly of claim 10, further comprising:
a first annular gap radially positioned between the upper bearing race and the housing; and
a second annular gap radially positioned between the lower bearing race and the housing.

12. A bearing assembly, comprising;
a housing having a longitudinal axis and a radially inner surface including a first annular recess defining an upper shoulder and a lower shoulder, wherein the upper shoulder of the housing and the lower shoulder of the housing are axially spaced apart;
a mandrel rotatably disposed within the housing, wherein the mandrel has a radially outer surface including a second annular recess defining an upper shoulder and a lower shoulder, wherein the upper shoulder of the mandrel and the lower shoulder of the mandrel are axially spaced apart;
wherein the first annular recess and the second annular recess define an annular containment chamber;
an annular thrust bearing disposed in the annular containment chamber, wherein the thrust bearing has an annular centerline oriented parallel to the longitudinal axis;
wherein the upper shoulder of the housing and the lower shoulder of the mandrel are planar, each being disposed in a plane oriented perpendicular to the longitudinal axis;
wherein the upper shoulder of the housing is radially centered relative to the centerline of the thrust bearing;
wherein the lower shoulder of the mandrel is radially centered relative to the centerline of the thrust bearing;
wherein the thrust bearing includes an upper bearing race and a lower bearing race axially spaced apart from the upper bearing race;
wherein the upper bearing race is configured to engage the upper shoulder of the housing and the upper shoulder of the mandrel;
wherein the lower bearing race is configured to engage the lower shoulder of the housing and the lower shoulder of the mandrel.

13. The bearing assembly of claim 12, wherein the thrust bearing has an annular centerline disposed about and parallel to the longitudinal axis;
wherein the upper shoulder of the housing has a first radial width centered on the annular centerline;
wherein the lower shoulder of the mandrel has a second radial width centered on the annular centerline;

wherein the upper shoulder of the mandrel is positioned radially inward of the annular centerline; and
wherein the lower shoulder of the housing is positioned radially outward of the annular centerline.

14. The bearing assembly of claim 13, further comprising:
an upper annular radial bushing positioned radially between the upper bearing race and the mandrel;
a lower annular radial bushing positioned radially between the lower bearing race and the mandrel.

15. The bearing assembly of claim 14, further comprising:
a first annular gap radially positioned between the upper bearing race and the housing; and
a second annular gap radially positioned between the lower bearing race and the housing.

16. The bearing assembly of claim 12, wherein the upper shoulder of the housing has a first radial width;
wherein the lower shoulder of the mandrel has a second radial width;
wherein the first radial width is the same as the second radial width.

17. The bearing assembly of claim 12, wherein the mandrel is configured to move axially relative to the housing between:
a first position in which the upper shoulder of the mandrel and the lower shoulder of the mandrel are positioned axially below the upper shoulder of the housing and the lower shoulder of the housing, respectively; and
a second position in which the upper shoulder of the mandrel and the lower shoulder of the mandrel are axially above the upper shoulder of the housing and the lower shoulder of the housing, respectively.

18. The bearing assembly of claim 12, wherein the thrust bearing includes an upper bearing race, a lower bearing race, and a bearing axially disposed between the upper bearing race and the lower bearing race.

19. The bearing assembly of claim 18, wherein the upper shoulder of the housing is radially centered relative to the upper bearing race and the lower shoulder of the mandrel is radially centered relative to the lower bearing race.

20. A method for transferring axial thrust loads with a bearing assembly, comprising:
rotatably disposing a mandrel within a housing;
wherein the housing has a longitudinal axis and a radially inner surface including an upper shoulder and a lower shoulder axially spaced from the upper shoulder of the housing;
wherein the mandrel has a radially outer surface including an upper shoulder and a lower shoulder axially spaced from the upper shoulder of the mandrel;
positioning an annular thrust bearing radially between the housing and the mandrel, axially between the upper shoulder of the housing and the lower shoulder of the housing, and axially between the upper shoulder of the mandrel and the lower shoulder of the mandrel;
aligning a radial center of the upper shoulder of the housing with a radial centerline of the thrust bearing;
aligning a radial center of the lower shoulder of the mandrel with the radial centerline of the thrust bearing;
applying compression loads to the bearing assembly;
engaging the annular thrust bearing with the upper shoulder of the housing and the lower shoulder of the mandrel during application of the compression loads.

21. The method of claim 20, further comprising:
applying tensile loads to the bearing assembly;
engaging the annular thrust bearing with the upper shoulder of the mandrel and the lower shoulder of the housing during application of the tensile loads.

22. The method of claim 21, wherein the upper shoulder of the mandrel is radially offset from the radial centerline of the thrust bearing;
wherein the lower shoulder of the housing is radially offset from the radial centerline of the thrust bearing.

23. The method of claim 22, wherein the thrust bearing includes an upper bearing race and a lower bearing race axially spaced apart from the upper bearing race;
wherein the upper bearing race engages the upper shoulder of the housing during application of the compression loads;
wherein the upper bearing race engages the upper shoulder of the mandrel during application of the tensile loads;
wherein the lower bearing race engages the lower shoulder of the housing during application of the tensile loads and the lower bearing race engages the lower shoulder of the mandrel during application of the compression loads.

24. The method of claim 22, further comprising:
positioning an annular bushing radially between the upper bearing race and the mandrel;
positioning an annular bushing radially between the lower bearing race and the mandrel.

25. The method of claim 20, further comprising:
radially spacing the thrust bearing from a radially inner surface of the housing positioned axially between the upper shoulder of the housing and the lower shoulder of the housing.

* * * * *